(12) United States Patent
Zheng

(10) Patent No.: US 8,840,028 B1
(45) Date of Patent: Sep. 23, 2014

(54) METHOD AND SYSTEM FOR MANAGING BUSINESS RELATIONSHIPS VIA BUSINESS CARDS

(71) Applicant: Joe Zheng, Cupertino, CA (US)

(72) Inventor: Joe Zheng, Cupertino, CA (US)

(*) Notice: Subject to any disclaimer, the term of this patent is extended or adjusted under 35 U.S.C. 154(b) by 19 days.

(21) Appl. No.: 13/656,223

(22) Filed: Oct. 19, 2012

Related U.S. Application Data

(63) Continuation-in-part of application No. 12/246,507, filed on Oct. 7, 2008.

(51) Int. Cl.
*G06K 7/10* (2006.01)

(52) U.S. Cl.
USPC .................... 235/472.01; 235/462.45

(58) Field of Classification Search
CPC .............. G06K 17/0022; G06K 7/10722
USPC .............. 235/472.01, 472.02, 462.45, 462.46
See application file for complete search history.

(56) References Cited

U.S. PATENT DOCUMENTS

| 7,639,875 | B2 * | 12/2009 | Molnar et al. | 382/181 |
| 2006/0264236 | A1 * | 11/2006 | Mutz et al. | 455/557 |
| 2010/0054605 | A1 * | 3/2010 | Molnar et al. | 382/190 |

* cited by examiner

*Primary Examiner* — Daniel St Cyr
(74) *Attorney, Agent, or Firm* — Joe Zheng

(57) ABSTRACT

Techniques for capturing images of business cards, uploading the images to a designated computing device for processing and recognition are disclosed. In one implementation, a transmission means is provided to transport the images to the designated computing device for centralized management of integrated contact information for a registered user, where the images are recognized and extracted data from the business cards are entered as new records in a contact list of the registered user. Each of the givers of the business cards are notified by a designated device to establish a link with the registered user.

16 Claims, 10 Drawing Sheets

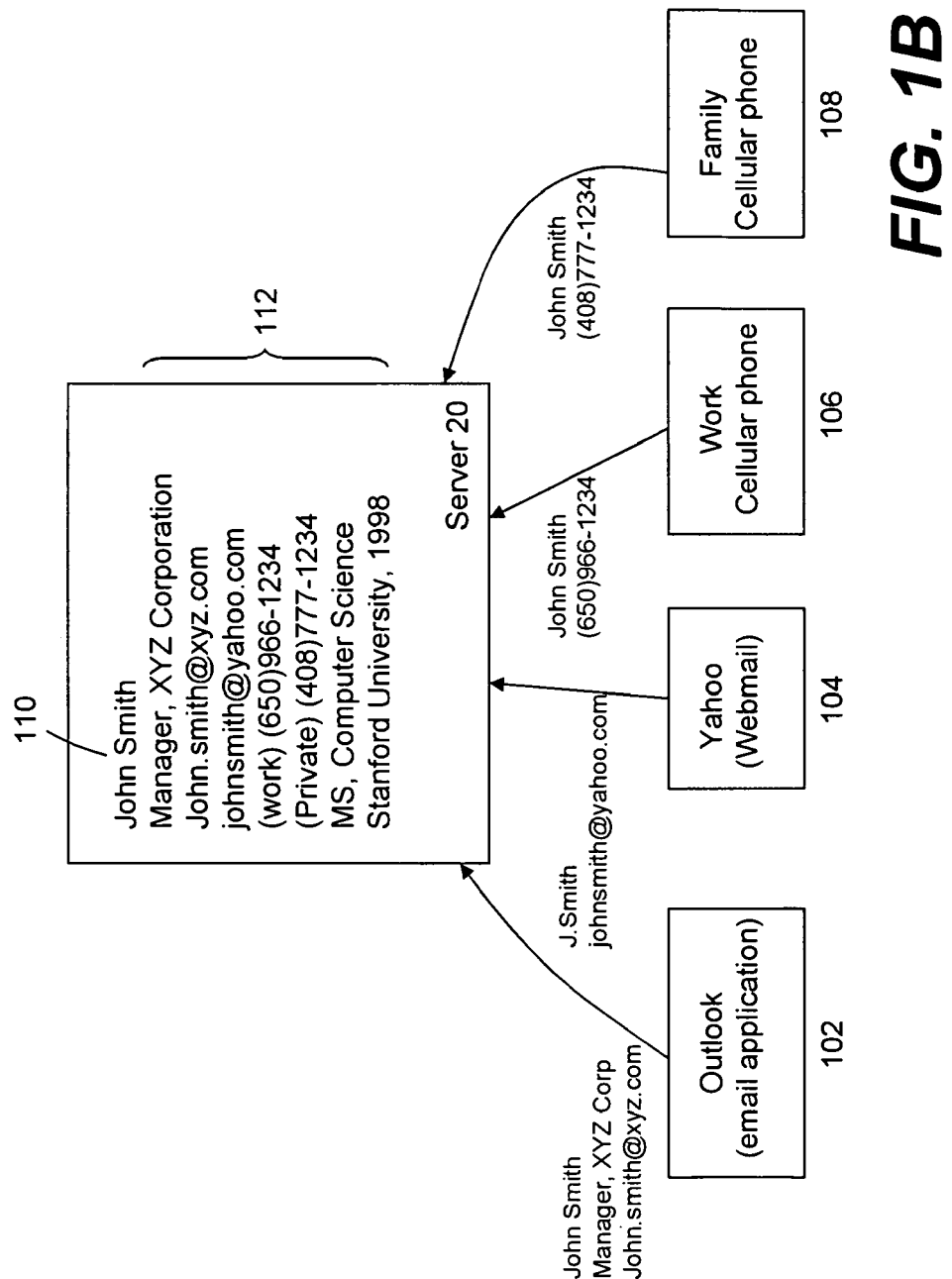

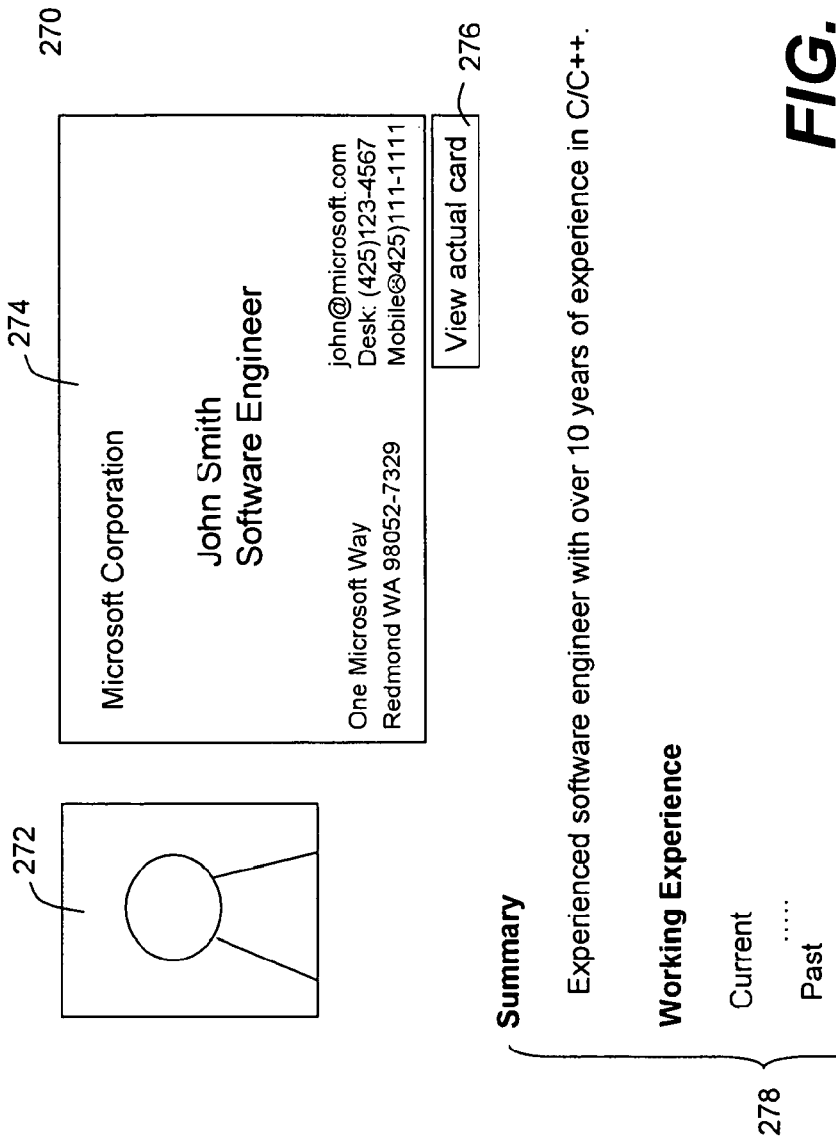

METHOD AND SYSTEM FOR MANAGING BUSINESS RELATIONSHIPS VIA BUSINESS CARDS

CROSS-REFERENCE TO RELATED APPLICATION

This is a continuation of U.S. application Ser. No. 12/436,138, filed on May 6, 2009, now U.S. Pat. No. 8,499,046, which is a continuation-in-part of co-pending U.S. application Ser. No. 12/246,507, entitled "Method and system for maintaining contact information" and filed Oct. 7, 2008.

BACKGROUND OF THE INVENTION

1. Field of the Invention

The present invention generally relates to the area of data communication. In particular, the present invention relates to method and system for capturing an image of a type of media carrying information that a user is desirous to acquire and updating the information when there is an update.

2. Description of the Related Art

A business card carries not only contact information but also represents an image of business. Exchanging business cards thus becomes a meeting protocol between two people when the two meet for the first time. As such there are approximately 15 billions business cards exchanged hands each year, but about 95% of these cards end up in trash cans. One of the reasons that so many business cards are thrown away is that these business cards are hard to manage and impossible to update.

In fact, as time goes by, many people end up with a lot of collected business cards from numerous occasions. However, managing these paper-based or banner-like physical business cards is indeed not an easy task. Habitually, many people just add collected business cards on a pile, sometimes the pile becomes so high or so big that the bottom part of the pile has to be thrown away, unknowingly throwing away important contact information that may be useful from time to time.

There are paper versions of business card organizers with a few pages, each of the pages including an array of plastic transparent pouches that allow users to insert one business card in each of the plastic pouches. A business card organizer provides a way similar to a book for a user to look for a particular card. However, soon after a business card organizer makes it difficult to organize received business cards. Whenever a new card is received, those cards already inserted in the plastic pouches would have to be shifted if the user desires to keep all the cards in an order. In reality, newly received cards are often stacked on other cards that are already in the plastic pouches, resulting in a disorganized business card organizer with many of them being obsolete over times. Worse, a user has no way to decide which ones shall be discarded.

An advanced way to manage collected business cards is to use business card scanners. Like sheet-fed scanners, a business card scanner is a smaller version, particularly designed to scan business cards. Typically, a software package is installed in a host computing device (e.g., a PC or PDA). The software package may include a driver for scanning/receiving image, an OCR (Optical Character Recognition) engine and an electronic business card organizer. When a card is scanned, the image of the card is transported from the scanner by a cable (e.g., a USB cable) to the host computing device executing the software, to extract data from the image by the OCR engine and to enter the extracted data into what is commonly called an electronic address book. As more business cards are scanned in, the electronic address book is gradually populated. The electronic address book may provide a sorting function and/or a searching function for a user to quickly locate contact information of a particular person being sought. Compared to the number of people that need to manage their business cards, however, only a limited number of users are using business card scanners to manage their business cards electronically.

It has been observed that it takes some time (e.g., 10~20 seconds) to scan a card, process an image of the card, and recognize the characters in the image, often with some errors. A user sometimes has to correct the errors before the data is saved in the electronic address book. Further the electronic address book is only locally accessed unless the user transports the electronic address book to a portable device. Nevertheless, the majority of the electronic address book quickly becomes obsolete when persons (a.k.a., givers) of the business cards have changed their jobs, phone numbers or email addresses.

Some portable devices introduced recently include a camera and a software module. A user can take a snapshot of a business card using the camera. The image of the card is then processed in a portable device. Being a portable device and of low cost, the computing power (horsepower) in the portable device is often very limited. As a result, it takes a longer time to process such an image in the portable device. Moreover, should a portable device be lost, the user may have lost his/her entire electronic address book. Likewise, the majority of the address book becomes obsolete over time.

There is thus a great need for mechanisms that help professionals, business people and others manage their received business cards more efficiently and keep their address books updated all the times.

SUMMARY OF THE INVENTION

This section is for the purpose of summarizing some aspects of the present invention and to briefly introduce some preferred embodiments. Simplifications or omissions in this section as well as in the abstract or the title of this disclosure may be made to avoid obscuring the purpose of this section and the abstract/title. Such simplifications or omissions are not intended to limit the scope of the present invention.

The present invention is generally related to techniques for capturing images of business cards, uploading the images to a designated computing device for processing and recognition, providing a mechanism to update extracted data from the images when there are changes. Depending on implementation, there are a number of ways to capture images of business cards. A transmission means is provided to transport the images to the designated computing device for centralized management of integrated contact information for individual users. As a result, a user may access his/her updatable integrated contact information database anywhere anytime from a chosen device.

According to one aspect of the present invention, synchronizing personal contact information with or from different sources is disclosed. Each of the sources, such as email applications, cell phones or PDA, provides a fractional part of the personal contact information. Through a website (i.e., a server or system), all fractional personal contact information is consolidated, synchronized, processed or updated. In return, any of the resources may be synchronized to get a copy of the latest version of the contact information. According to one aspect of the present invention, contacts in a list by a registered user are also registered with the server. Any of the contacts may update their respective contact information that can be timely reflected in the list. As a result, the registered user always has a latest version of the contact information for some or all of his/her contacts without even knowing some have already been changed or updated.

According to another aspect of the present invention, various techniques for capturing images of business cards and transporting the images to the server are disclosed. An image capturing device or mechanism is designed or enabled to capture an image of a business card, the image is then transported via wireless or wired means to the server for processing. In other words, computing functions necessary to extract data from the images are now centralized and executed in a server that is typically has much more computing power than a standalone personal device (e.g., a PDA, a PC or a mobile phone).

According to yet another aspect of the invention, a verification interface is provided to route a result from the centralized computing or recognition to a stage for verification. Depending on implementation, the verification may be conducted with or with human intervention to ensure that the result is as accurate as possible before the result is finally released to a designated account.

The present invention may be implemented in different forms, as a method and a system. Depending on implementation, the present invention may be implemented in modules some of which are executed in a server device, a computer or a portable device. According to one embodiment, to make a server or a cluster of servers configured to perform the functions contemplated in the present invention more efficiently, each account is set to a limited number of business cards that can be processed in a predefined period or additional charge may be requested. Should blurred images be uploaded by a user, such a blurred image is retained in an account to allow the user to review it or be aware of the failure to enter electronically the corresponding business card in the account.

According to another embodiment, the present invention is a method for managing contact information, the method comprises: receiving an image of a business card from a device associated with a user that has received the business card from a giver of the business card; processing the image for optical character recognition (OCR) in an OCR engine; entering extracted data from the OCR engine as a record into an account of the user so that later the user synchronizes a chosen device with the account to update a local address book in the chosen device, wherein the local address book has the record; and notifying the giver that the business card has been entered electronically by the user, wherein the giver is invited to establish an account so that the giver is able to manage the record to keep the user updated of any change to the record.

According to another embodiment, the present invention is a system for managing contact information, the system comprises: a server managing at least an account of a first user; and a first device used by the first user to take an image of a business card received from a second user, the device transporting the image to the server, wherein the server is configured to process the image for optical character recognition after a parameter accompanying the image is verified with the account of the first user, a result from the optical character recognition is entered into the account of the first user, and meanwhile the server is configured to send a notification to the second user indicating the business card has been electronically entered in the server. The system further comprises a second device, used by the first user, having a local address book, the second device being caused to synchronize with the account of the first user at the server, wherein the local address includes the record derived from the image of the business card.

There are numerous benefits, features, and advantages in the present invention. These objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1B shows a server synchronizing with four exemplary email tools or devices (collectively referred to as devices);

FIG. 2D shows an exemplary layout of a user account maintained on a server and accessible from a chosen device;

DETAILED DESCRIPTION OF THE PREFERRED EMBODIMENTS

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-3E. However, those skilled in the art will readily appreciate that the detailed description given herein with respect to these figures is for explanatory purposes as the invention extends beyond these limited embodiments.

Figure 1A:
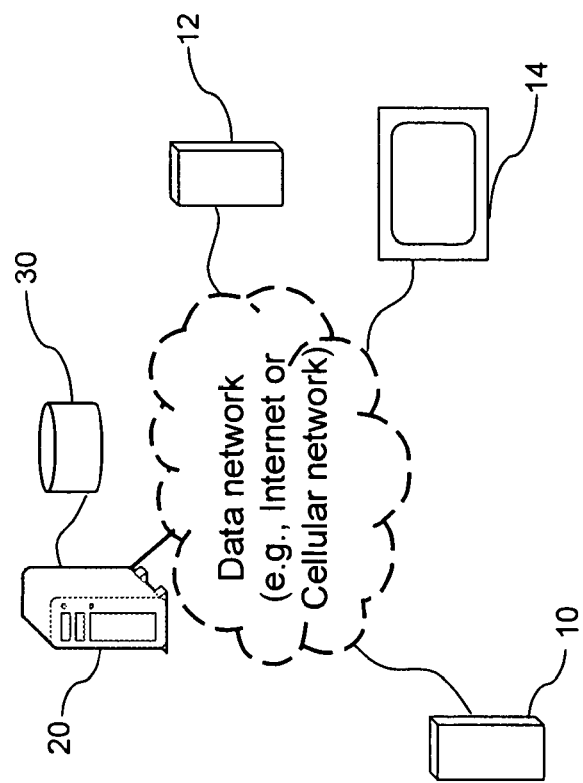
FIG. 1A shows a system configuration in which the present invention may be practiced in accordance with one embodiment thereof.

FIG. 1A shows a system configuration in which the present invention may be practiced in accordance with one embodiment thereof. In addition to other services that could be provided, a server 20 is configured to manage synchronized contact information lists for all registered users. As used herein, a list includes one or more contact information records, each of the records used in the present invention is more than just an entry in an address book. As will be further described below, a contact information record includes a profile of a contact and a private note (e.g., to reminder to a user when/where/how the contact becomes known to the user) in addition to an entry commonly seen in an address book. In general, an entry in an address book includes a name (e.g., first and last name), affiliation(s) and title(s), email address(es) and phone/fax number(s). However, unless specifically stated, a contact information list and an address book may be used interchangeably herein for description purposes.

A database 30 is provided to support the server 20 to host a plurality of synchronized contact information lists and other related data. A registered user normally has a list of contacts (a.k.a., a circle of contacts), some or all of the contacts may also be registered users with the server 20. A record is created for each of the contacts. According to one embodiment, with proper configuration, one user updates some of his/her own record (e.g., a profile or contact information), those list him/her as a contact will automatically receive the update with or without the knowledge that this contact has updated some of his/her data.

Depending on implementation, the database 30 may be part of the server 20, distributed among different computing devices or remotely located from the server 20. Terminal devices 10, 12, and 14 represent a plurality of devices that may communicate with the server 20. An example of these terminal devices includes, but may not be limited to, a cellular phone, a PDA (personal data assistant), a PMP (Personal media player), and a computer, all having network capability. A user with any of these terminal devices may communicate with the server 20 to capture or obtain images of business cards and upload the images to the server 20. It should be noted that a business card or business cards are used throughout this description herein, those skilled in the art understand that other media (e.g., a webpage, a newspaper page) containing contact information or information a user desires to enter into his/her account shall also be included.

The user may synchronize, manage, update or download an updated address book maintained on the server 20 specifically for the user to a chosen device (e.g., a PC running Outlook or Yahoo email, or a PDA). The server 20 is configured to communicate with devices being used by a registered user to synchronize respective address books residing locally. For example, as shown in FIG. 1B, a registered user may use Microsoft Outlook 102 (i.e., an email application) to receive work related emails, a Webmail 104 (e.g., Yahoo email) to receive personally related emails, a company provided cellular phone 106 for work-related calls, and a private cellular phone 108 for calls with family members or friends. Through an account 110 registered with the server 20, the user may cause each of these email tools and devices 102, 104, 106 and 108, collectively referred to as devices or sources, to be synchronized with the server 20.

The account 110 includes contact information contributed respectively from these devices 102, 104, 106 and 108. For example, the registered user may have used any of these devices 102, 104, 106 and 108 to communicate with a contact named "John Smith". As a result, each of the devices 102, 104, 106 and 108 keeps fractional contact information of John Smith. For example, Outlook 102 keeps some of a profile of "John Smith" as John Smith may have entered some information in his email setting. The profile may include his title, company name, company address, his company email address, phone and fax numbers. The Webmail 104 has his private email address as the registered user may have exchanged emails with John Smith on matters other than the work. Likewise, the cellular phone 106 is often used to speak with John Smith about the work, hence remembering his work cell phone number, and the cellular phone 108 receives sometimes calls from John Smith on his home phone. In other words, each of the devices 102, 104, 106 and 108 maintains fractional contact information about John Smith.

As will be further described below, each of the devices 102, 104, 106 and 108 may be configured to synchronize with the server 20, uploading respective local address books having fractional contact information to the server 20, where the server 20 consolidates or process the received fractional contact information to form a complete entry 112 with user entered data (e.g., a short profile) in an address book for the registered user. Such an address book may be synchronized to be returned to any of these devices 102, 104, 106 and 108 to supplement the original local fractional contact information or downloaded to a new or another device being used by the registered.

It should be noted that if one of these devices 102, 104, 106 and 108 acquires full contact information, other devices may equally be synchronized to receive an updated address book. According to one embodiment, one of these devices 102, 104, 106 and 108 is equipped with a camera or connected to an image capturing device. The device is configured to upload a created image to a designated server.

Figure 1C:
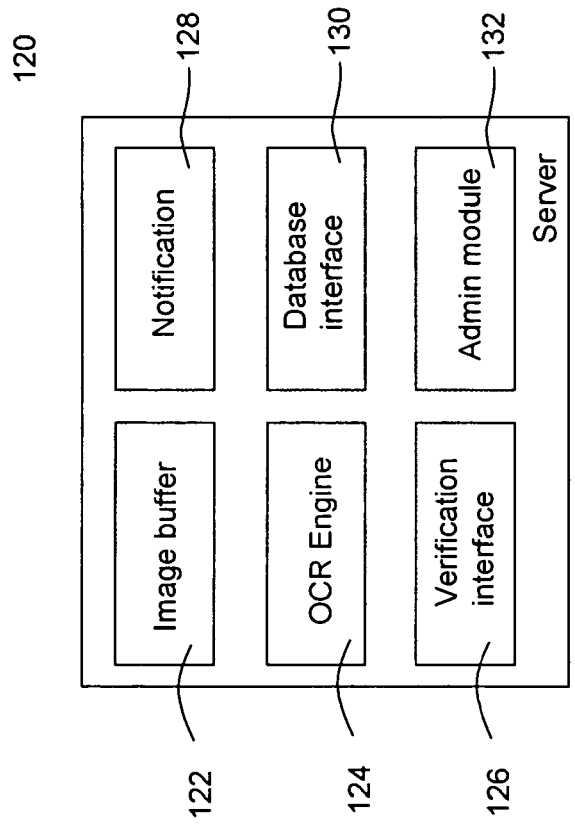
FIG. 1C shows an exemplary functional block diagram of a server that may corresponds to the server of FIG. 1A or FIG. 1B.

FIG. 1C shows an exemplary functional block diagram 120 of the server 20. An image buffer 122 is provided to receive images or data transported from a user. Depending on implementation, the images or data may be those captured from business cards or other type media containing contact information. The images may be in a predefined format (e.g., JPEG) and are transported via a network (e.g., the Internet, 3G, 4G or GPRS network) and are buffered in the image buffer 122 for subsequent processing.

It is assumed that the images are from users that have registered with the server 20. The images are then processed by an OCR engine 124 to recognize the characters in the images. It should be noted that the OCR engine 124 running on the server 124 is generally much powerful than those designed for a PDA or a personal computer with limited computing power. Since a server has more computing power, more sophisticated image processing functions and recognition capabilities can be employed. In one embodiment, the OCR engine 124 is designed to recognize images of business cards, capable of recognizing letters or characters comprising, for example, first and last names, company name, title, postal address, email address and phone, fax and mobile numbers.

Regardless how good the OCR engine 124 is designed, it makes mistakes in its recognition for various reasons, for example, sometimes mistaking "a" as "e" or "I" as "1", largely depending on the quality of the images and/or fonts. In one embodiment, a verification interface 126 is employed to route the results from the OCR engine 124 to a human operator for verification before the extracted data is entered into an account. Depending on the errors, the human operator may make some minor manual corrections to ensure that a registered user receives the extracted data as accurate as possible. In another embodiment, the verification interface 126 is employed to route the results from the OCR engine 124 to a database for automatic verification. As more users are registered with the server 20, a verification database is formed based on the information in the accounts. The verification database may be a separate database, the database 30 of FIG. 1A or part of the database 30 of FIG. 1A. In any case, the verification database is gradually populated over time. For example, an output from the OCR engine 124 contains an email address john@inte1.com. After the email address is verified with the verification database, it concludes that the email address should be corrected as john@intel.com (assuming that the database does have a company name "Intel" used by some of the registered users). According to another embodiment, a crawling module (similar to the one being used by the search company to discover various websites) may be employed to discover valid domain names, forming and populating such a verification database to ensure some of the basic information from the images of business card is correct.

As will be further described below, in one embodiment, the email address shall be right to ensure that the giver of a business card can be notified by email that his/her business card has been entered electronically. A notification module 128 is provided to perform the notification. Based on the extracted email address, the notification module 128 is configured to contact the giver by email using the email address from the business card that his/her business card is now electronically available on the server 20 (of course, the access to it is restricted) and invite the giver to join the server 20 to enjoy the same service being provided, and further to verify or update the data extracted from his/her business card. As a result, others having the privilege to access the business may automatically get the update from the giver if there is a change.

A database interface 130 is coupled to the database 30 of FIG. 1A. The database interface 130 enters the extracted data from the images of business cards into proper user accounts. In one embodiment, the database interface 130 enters the verified output from the OCR engine 124 into a designated account.

An admin module 132 is provided to ensure that only the registered users can enjoy the services being provided. In other words, any person may upload images (e.g., sending an image from a cellphone) to the server 20. Upon receiving the image, the admin module 132 is activated to verify the identity of the person (e.g., the phone number or email address from which the image is sent). If the phone number or email address is not registered, the person is notified by return that the image will not be processed and perhaps is immediately invited to register with the server 20 to proceed with the image. In another case, there are a limited number of images a registered user may upload in a predefined period (e.g., a month). If the user has used up the number, the admin module 132 will block additional images from being processed and/or buffer those images for processing when a new period or quota starts.

Figure 2A:
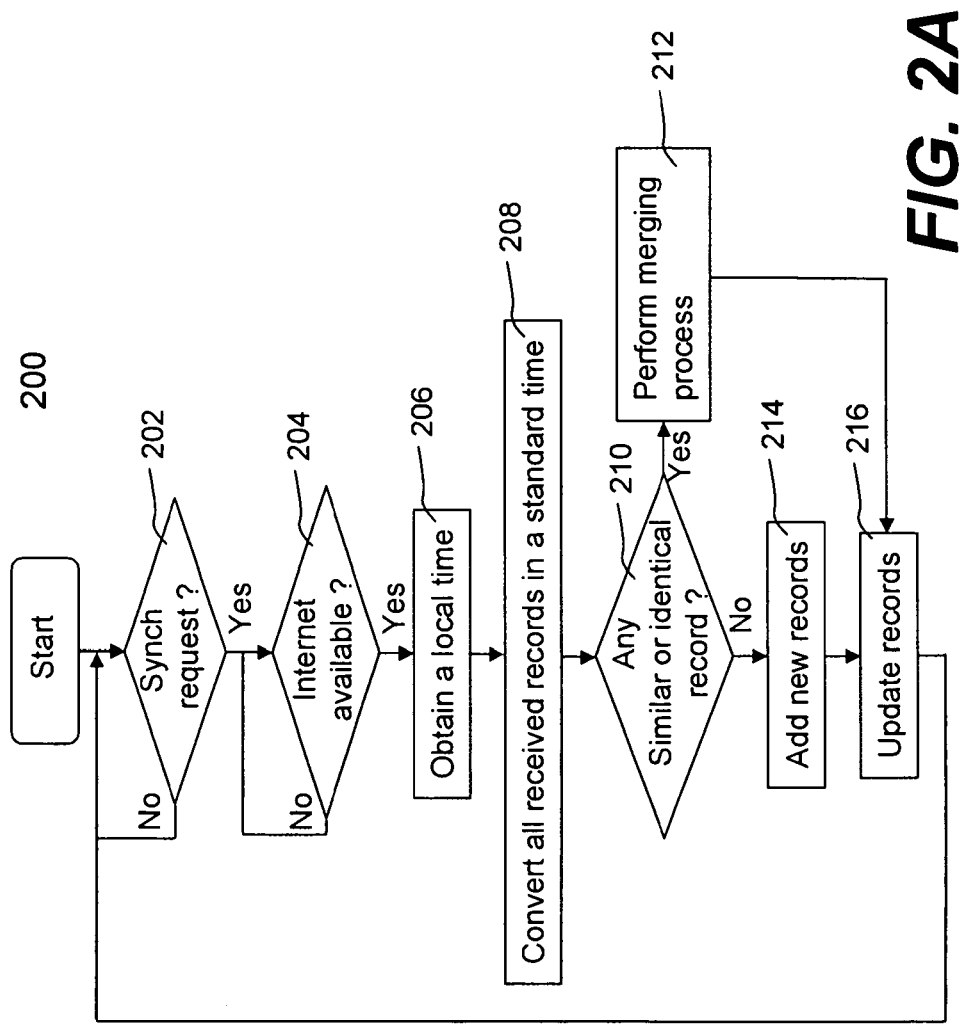
FIG. 2A shows a flowchart or process of consolidating fractional contact data from different sources.

FIG. 2A shows a flowchart or process 200 of consolidating fractional contact data from different sources. An example of the sources includes, but may not be limited to, a computer (e.g., a laptop computer), a cellular phone (e.g., GPRS or 3G phone) and a PDA (e.g., a Blackberry or iPhone). The process 200 may be implemented in software or in combination of software and hardware. To facilitate the understanding of the process 200, FIGS. 1A and 1B may be referenced according to one embodiment of the present invention.

It is assumed that a user "John Smith" has established an account with a server (e.g., the server 20 of FIG. 1A). The user may access the server from any computer via a data network (wireless or wired) to create a profile of himself. The profile may include his name, his available email addresses, his instant messaging ID, his phone numbers for contacting. Optionally, the profile may include his title, his company name and address alone with product/service areas his company may offer. The profile may also include his educational background (degrees, schools and majors) and other related data that may be of interest to some of his contacts. Affiliated with this account is a list of contacts or entries, thus John Smith has his own circle of contacts that may be constantly updated by respective contacts. Each of the entries has a profile similar to what this account has. Initially, the profiles of the contacts may be incomplete but updatable from time to time by John Smith or the respective contacts themselves. For example, if John Smith has changed his cell phone and received a new phone number. Instead of calling each of his contacts, all he needs to do now is to update his record with the new cell phone number, those listed him as one of their contacts get the update about John Smith in their lists. Certainly, if John Smith does not want to maintain a relationship with one of his contacts, he may delete it from his list. In one embodiment, the deleted list is kept in a recycle folder to allow John Smith to recover the contact should John Smith accidentally delete the contact without the intent. As a result, the deleted one would not receive the update, neither does John Smith receive any update from the deleted contact. One of the advantages, benefits and objects in the present invention is that the server 20 keeps all users stay in touch with the people they want A profile of a contact in a list may be updated by the user as the user comes across something. For example, the area/profession the contact works is in communication equipment. Although the particular contact may not provide such information, the user adds the information for the contact in a private note and may facilitate him/herself in the future to search for help if there is a need for communication equipment.

It is assumed that the profile is for a contact named "Mary Jones". The same profile may be updated by Mary Jones on her end, provided that she is also a registered user of the server 20. According to one embodiment of the presentation, whenever Mary Jones updates her profile including her contact information (e.g., a phone number change), the update by Mary Jones is immediately reflected in the address book by John Smith. In an event that a data field edited by John Smith is now updated by Mary Jones, the information provided by Mary Jones overwrites what John Smith has written. However, if Mary Jones fills nothing in the data field, whatever entered by John Smith remains.

The registered user "John Smith" may have several devices to communicate with his contacts. As described above, some devices only capture the emails addresses while others only capture phone numbers. At 202, a synch request is made. The synch request may be made individually from each of the devices or from the server, manually (upon a request) or automatically (upon a schedule). When a device is being used, the device may be configured or initiated with proper confidential data (e.g., username/password) to check with the server to see whether there is any update from the server. Likewise, after the user logs into the server, the user may cause the server to synchronize with any of the devices that have been registered and may be synchronized at the time to push an update to a local version of the address book or upload an update to update the centralized version of the address book. In any case, the synch request can only be performed when the network access is available. Accordingly, at 204, such accessibility is checked.

It is assumed that the network access is available, the process 200 goes to 206 to obtain a local time. Depending on implementation and a terminal device, the local time may be obtained directly or derived from or with respect to the received data. The local time is used to determine which data is newer when comparing data received and data already in the server.

At 208, the timing of the received records is converted to a standard time (e.g., the Greenwich Mean Time (GMT)) with respect to the local time obtained at 206. Because there are so many time zones across the global, data records created or updated may look newer than that archived in the server. The conversion of the time at 208 makes it possible to determine whether the data records created or updated shall update the archived version.

For example, a business man is about to travel from Beijing to San Francisco. Before leaving at Beijing Airport at 11:00 AM January 1, he synchronized his PDA with the server with a new email address of a contact. By the time he arrived at San Francisco airport (SFO), he received an updated email address of the same contact. However, the time he arrived at SFO is 8:30 AM January 1, given that fact that the local time (PDT) in San Francisco is 15 hours behind the Beijing time. The server is configured to determine the second update received is actually newer when all are viewed with reference to the GMT. It should be noted, however, that some devices may simply use GMT. When this is the case, the function at 206 is to verify that the time used is GMT, the function at 208 will not be needed.

At 210, the received entries and the archived entries are compared to detect any updates from either side. When a received entry seems to be similar or identical to a corresponding one in the archived list, the process 200 goes to 212 to perform a merger. For example, a received entry is named after "Mike Doe" while an entry in the archived list is named after "M. Doe". A verification process (not shown) is performed to ensure that these two entries mean the same contact. An example of the verification process is to verify other information in the profile, for example, whether there is an email address in the received entry identical to an email address in the archived list. There may be other data (e.g., a phone number) that may be used to verify if two entries mean the same contact. The process 200 then goes from 212 to 216 to update the entire contact list.

When one received entry is different from any one in the archived list, that means that the entry is for a new contact, the process 200 goes to 214 to add the new entry to the list before proceeding to 216. As a result of the synch request, both the device and the server have a latest version of the address book for the registered user. Whenever John Smith needs to look up for contact information of a contact, he may simply log into the server and search what he needs, he can always get the latest. Similarly, John Smith may use a device that has been synchronized with the server to contact anyone in the address book using the latest version thereof. John Smith can also use a different device to synch with the server, the device is caused to download the update or the entire list to the device. From the device, John Smith can get the latest contact information for a person he needs to contact.

According to statistics, there are 60% of cell phone users who change their cell phones each year (e.g., lost cell phone or update to a new phone). In US, there are certain cellular standards that do not support SIM cards. When changing a cell phone without a SIM card, all the phone numbers in the old phone would have to be gone with the phone unless a fee would be paid to ask a dealer to transfer the phone numbers from the old phone to a new phone (which sometimes may not be done because of interface issues). Many GSM cell phones do support SIM cards on which phone numbers could be stored. However, when a phone is lost, all the numbers are lost as well with the phone. Getting a new phone would not recover the numbers. As a result, many people have lost contact with their colleagues or friends because they have lost their cell phones. With the present invention, all a user needs to do is to log into his/her account at the server from a new cell phone via GPRS, 3G, 4G or other wireless network. Once the connectivity is established, his/her new phone can download the contact lists from the server, assuming all login information has been successfully verified. In one perspective, the present invention solves the problem of losing contact information when a terminal device is lost or no longer functioning.

Figure 2B:
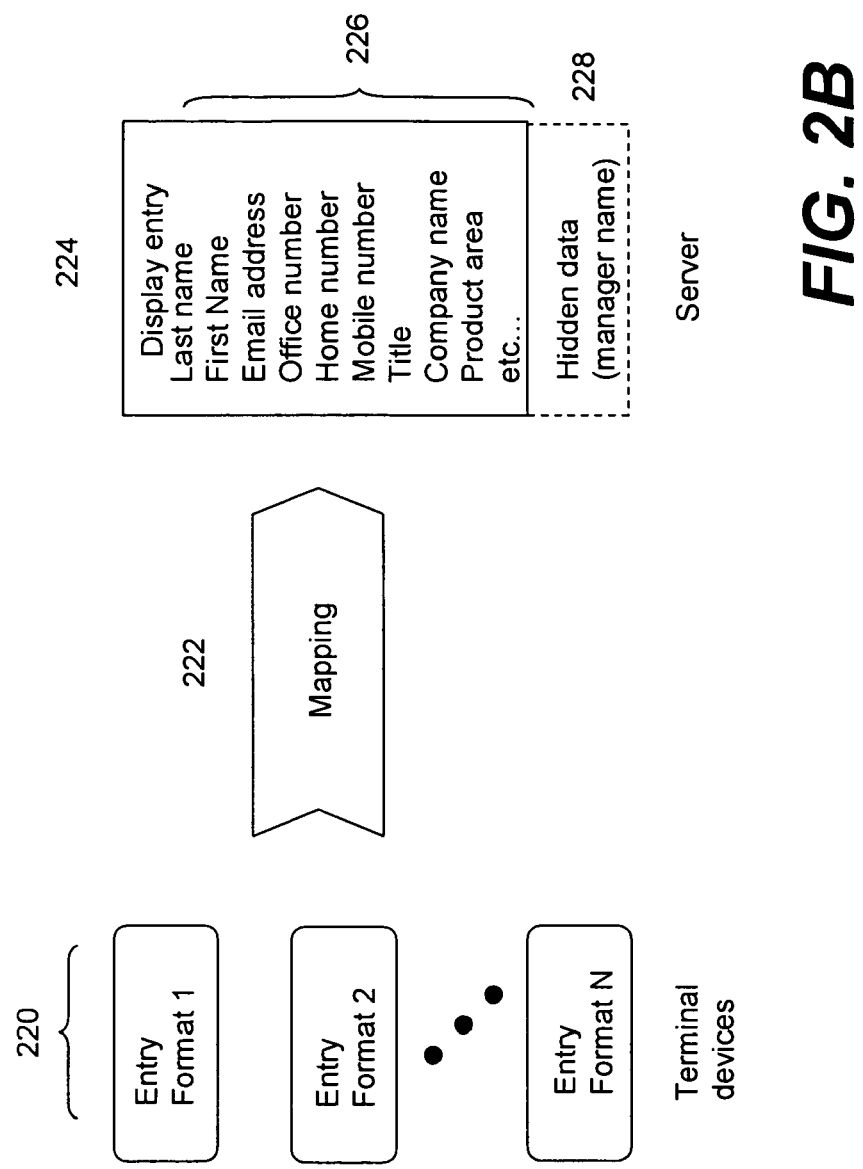
FIG. 2B shows a situation in which an address format is different from that in a server, in which case all data in an entry from a device is transported to the server while some or all of the transported is editable or updated by a user.

FIG. 2B shows a practical situation in which the address format is different from that in a server. An entry in a local address book of one device has more data fields or different fields than an entry in a local address of another device. For example, Microsoft Outlook has fields such as manager's name and assistant's name while Microsoft Outlook Express (OE) does not have such fields but has IP phone number or digital ID that Outlook does not have. Besides the differences in fields of two entries of the same record from two different devices, the same record on a server may have fields that are less or more in number than that from a terminal device.

According to one embodiment as shown in FIG. 2B, there are several entry formats 220 from several devices. A map 222 is provided to bridge the differences among the entry formats 220 and the one used on the server. When a synchronization process happens, a mapping process takes place to map data on the side of the entry formats 220 to corresponding fields defined on the server. Usually, the data fields in an entry on the server includes some of the basic fields, such as last name, first name, email address and etc. as shown in FIG. 2B. These basic fields 226 are displayable and most of them are editable or updatable. For those extra fields from a device that are not needed or required by the server, hidden fields 228 are provided to store the data for the extra fields. These hidden fields 288 are those that may not be seen or editable from the server.

For example, a device is Outlook that has two fields "Manager name" and "Assistant name" that are not used by a corresponding entry on the server. When the device is first synchronized with the server, all data in the entry from Outlook is transported to the server, where only data in the basic fields are extracted to add or update a corresponding entry on the server. Data in other fields, such as "Manager name" and "Assistant name", are kept in the hidden area with the hidden fields. One of the advantages in transporting the entire data in an entry from a device is to make the implementation of the synchronization simple, thus there is no need to perform data selection for synchronization for different devices.

Similarly when an update on an entry on the server is synchronized to a corresponding entry on a local device, an entire entry for a contact including those in the hidden fields is transported to overwrite an outdated entry in the local device. In a different embodiment, only the update may be transported to update a record or entry, in which case, the changes to the entries in a list are transported between a server and a local device.

Figure 2C:
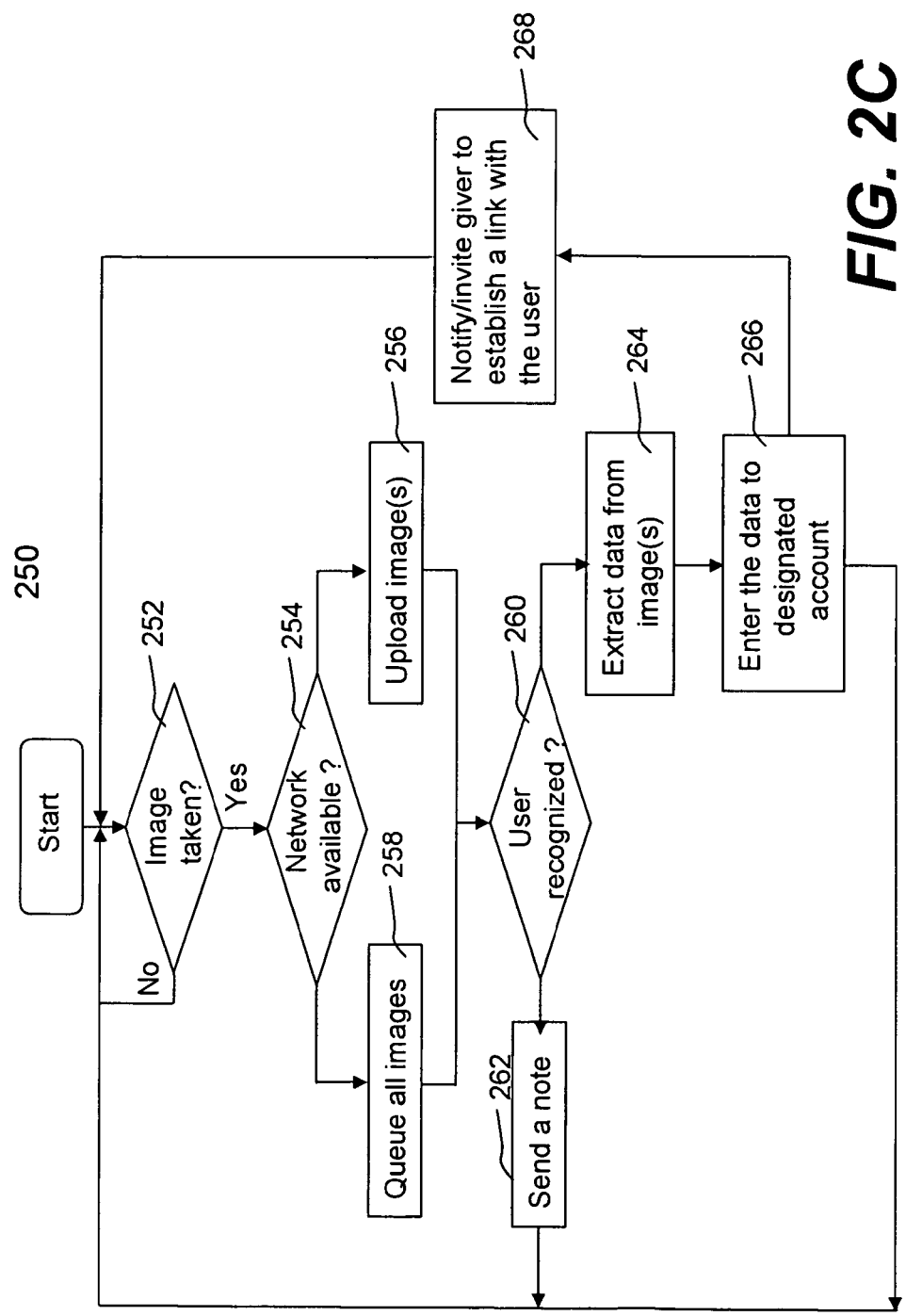
FIG. 2C shows a flowchart or process of a server functional block diagram in accordance with one embodiment of the present invention.

FIG. 2C shows a flowchart or process 250 of the server functional block diagram shown in FIG. 1C in accordance with one embodiment of the present invention. The process 250 may be implemented in software, hardware or in combination of both software and hardware. It assumed that a user has an available means to take an image of a business card. The means as will be further discussed below may include, but not be limited to, a phone camera, a PC camera, a business card scanner, and a screen capturing module.

At 252, a user decides if an image of a business card is taken. The process 250 proceeds only when an image is taken. After the image is taken (perhaps a preview of the image is provided), the network availability is determined at 254. Depending on what device the user is using, there may be different ways to determine the network availability. According to one embodiment, the user uses a phone camera to take a snapshot of a business card, the cellphone being used is already connected in a network (e.g., an iPhone provides 3G access), in which case the image is uploaded via the network to a server (e.g., corresponding to the server 20 of FIG. 1A or 120 of FIG. 1C) at 256. According to another embodiment, the user uses a phone camera to take a snapshot of a business card, the cellphone is not connected in a network. Similar to sending a photo to another cellphone, the user sends the image to a dedicated phone line coupled to the server. According to still another embodiment, a software module is downloaded or pre-installed in a cellphone that executes the module to turn on a GPRS connection to the server, provided that the user has subscribed to the GPRS service. The image can be sent to the server via the connection. According to still another embodiment, a computer device with a camera (e.g., a PC camera) is activated to take a snapshot of a business card, the image can be sent to the server by the Internet via various means (e.g., email, HTTP or FTP, secured or non-secured). According to still another embodiment, a scanning mechanism is used to scan or capture an image of a business card, the image is transported to a host computing device that is configured to upload the image to the server via one of the available networking means. According to yet another embodiment, a screen capturing module may be activated to allow a user to draw a capturing window over an area containing information the user desires to enter into his/her address book. The created image is then transported to the server by any of the means that may be available. Without manually entering the information in the area of interest, the user may use the service offered by the server to automatically enter the information into his/her account.

In an event, no connection to the server is available, the image is locally buffered at 258. All images in the buffer will be released to the server when a transmitting connection becomes available. At 260, when an image (s) has arrived in the server, the identity of the user needs to be verified before the image can be processed. Depending on how the user sets up his/her account and the way he/she sends in the image, the identity that may be used for verification purpose may include, but not be limited to, a phone number, an email address, username/password or an IP address. In other words, when the image arrives, the identity is also sent along with. For example, if the image is sent from a cellphone, the cellphone number can be used to verify the identity of the user. If the image is sent by email, the email address can be used to verify the identity of the user. Accordingly, in setting an account for a user, the server is configured to ask the user to provide an identifying parameter (e.g., an email address or a cell phone number) for binding purpose. An image or data accompanied by the identifying parameter can be readily verified by the server.

In a case that the identity can not be verified (which means it could be from a new user or a user registered with a wrong identifying parameter), a notification is sent where the image came from at 262. The notification may be an advertisement-like message inviting the sender of the image to register with the server or tell the sender that a registration is necessary before the image can be processed. In one embodiment, the image is still processed to extract the email address therein. Thus the person in the business card can be notified by email of the business card service being offered and invited to sign up.

Referring back to 260 where it is assumed that the identity has been successfully verified, the process 250 now goes to 264 where the image is processed and analyzed. The functions performed at 264 may include, but not be limited to, preprocessing (e.g., sharpening, increasing contrast or segmenting) and optical character recognition (OCR) and content recognition. The OCR is performed by an OCR engine. The content recognition rearranges the recognized characters. For example, numbers after characters "mobile" means a mobile phone number, and characters including a sign "@" means an email address, other graphic designs corresponding to no characters are dropped.

The results from 264 may then be entered into an account corresponding to the identity verified at 266. In one embodiment, the results from 264 are routed to a verification interface to make sure that the results from 264 are as accurate as possible. A means coupled to the verification interface corrects mistakes if there are any in the results from 264. As a result of the process 250, a business card is automatically entered as a new record in a private address book and may be synchronized into a chosen device by the user from anywhere at anytime. All the user did is a "click and done" action.

FIG. 2D shows an exemplary layout 270 of a user account maintained on the server and accessed from a chosen device. The layout 270 may be viewed in a browser. In one embodiment, the layout 270 includes a photo window 272 to allow a user to upload a photo, an artificially generated business card 274 based on the extracted data from an image of a business card, a button 276 and a profile 278. Depending on a setting, the photo may be viewed by all users or only contacts of the user on the server. The business card 274 is presented in a style chosen from a plurality of templates and populated from the extracted data from an uploaded image. Again depending on a setting, the business card 274 may be viewed by all users or only contacts of the user on the server. The button 276 is provided to allow the user to retrieve the uploaded image. In one embodiment, after the image is processed and recognized, the image is stored in a storage space but linked to the corresponding account. Should the user decide to view the original image, the button 276 or key may be activated. In other words, the image corresponding to a contact is not automatically loaded when the contact is viewed or located. The advantages include the saving of data bandwidth and faster display of the relevant information about a contact being located or checked. If a contact page does not show such a button 276 (no such an image is available), it may indicate that this particular contact may be entered other than from the image of a business card. The profile 278 allows the user or the contact him/herself to enter whatever that may describe the contact.

Meanwhile at 268, based on the email address or a cellphone number extracted in the business card, the server is configured to send a notification to the person in the business card, i.e., a giver (e.g., "Mary") of the business card. The notification may be an advertisement-like message, but contains a note that her business card has been electronically entered by a user (e.g., John) to his private online address book, and further advises the giver Mary that if she signs up with the server, she could stay in touch with the user John by providing any change to the information originally in her business card. Should Mary sign up with the server, either John or Mary may update his or her own profile or record, any change made will be automatically reflected in an online address book of each other.

As an example, referring to FIG. 2D, the content in the layout 270 is managed by John Smith and may be updated by himself anytime, although the layout 270 is displayed in an account by one of the contacts of John Smith (e.g., Mary Jones). Mary received a business card from John and took a snapshot of it by an image capturing means, thus an entry is created in the account of Mary on the server. As described above, the server notifies John, assuming that John is not a user yet, John then decides to sign up with the server and is able to complete his profile and may correct, supplement or update his contact information/profile anytime if there is a need. Whenever the record is updated, Mary sees the latest version without being explicitly notified. Should John be already a registered user, a link to the account of John can be established for the account of Mary. In a sense, the service provided by the server makes it possible to keep those wishing to stay in touch keep in touch all the time. As described above, FIG. 2A and FIG. 2B may be also used to update a chosen device by synchronizing it with the account on the server.

In one embodiment, a software module implementing some aspects of the present invention is provided for downloading or installation in a computing device. FIG. 3A shows a display 300 with a camera 302. The display 300 and the camera 302 may be part of a computing device (not shown) with network capability. A user may hold a business card in front of the camera 302. When activated, the software module turns on the camera 302 to take a snapshot of the business card. A preview 304 may be provided to allow the user to see the quality of the image. In case the image is blurring, the user may take another snapshot. When the user determines that the image is clearly enough (namely, the characters in the image are clearly shown), an "accept" button or key is activated to upload the image to a designated server (e.g., the server 20 of FIG. 1A or 120 of FIG. 1C) by a data transmission means (e.g., email, HTTP or FTP).

Figure 3B:
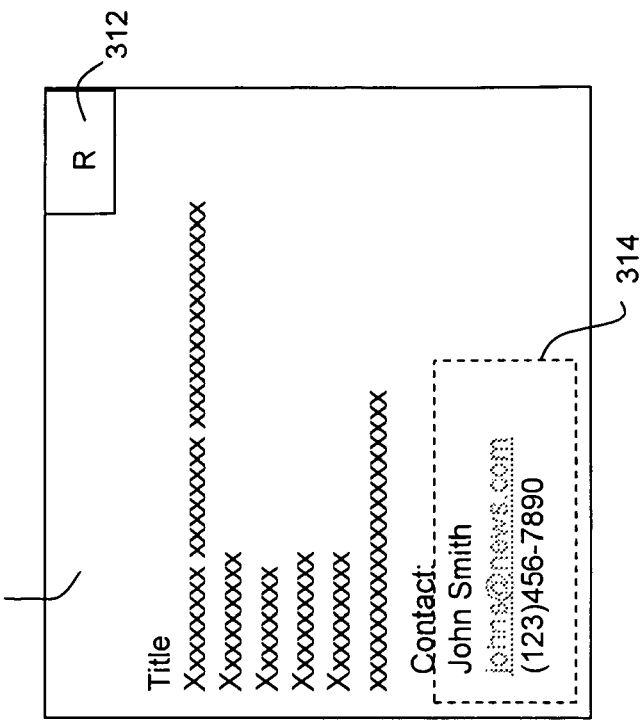
FIG. 3B shows another embodiment in which a screen capturing module is provided to allow a user to capture an area of interest
Figure 3A:
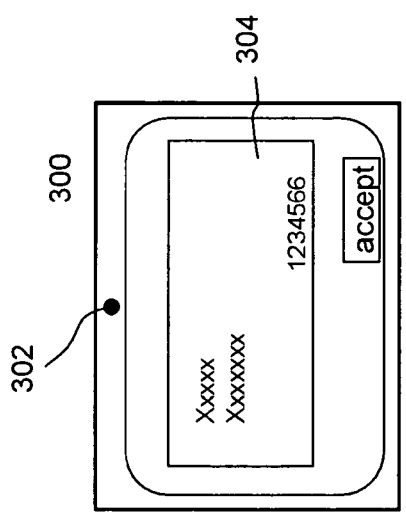
FIG. 3A shows a display with a camera for capturing an image of a media (e.g., a business card)

FIG. 3B shows another embodiment in which a screen capturing module is provided to allow a user to capture an area of interest. The screen capturing module may be included in a software module implementing some aspects of the present invention for downloading or installation in a computing device. When a user is reading an article being displayed on a display 310, a screen capturing button 312 is provided (e.g., superimposed on top of the page). When the button 312 is clicked, an indicating window 314 (e.g., a dotted area defined by a mouse arrow) is formed as a user draws such a window over an area of interest. If the user desires to remember the information in the display, all he needs to do is to define the window 314 over the area of interest and the screen capturing module is activated to take an image of the area of interest. Similarly the image is upload to a designated server (e.g., the server 20 of FIG. 1A or 120 of FIG. 1C) by a data transmission means (e.g., email, HTTP or FTP).

Figure 3C:
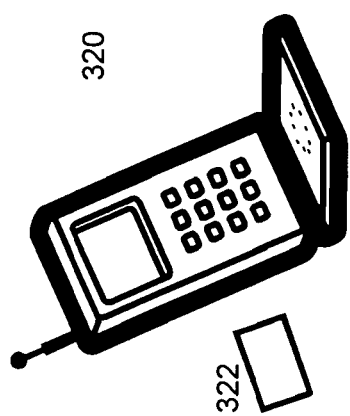
FIG. 3C shows a configuration of using a cellphone as an image capturing device.

FIG. 3C shows a configuration of using a cellphone 320 as an image capturing device. As cellphones are getting more popular and more cellphones are equipped with cameras, a cellphone becomes one of the most convenient tools for users to take images of business cards as they have received. For example, a user may have collected some business cards at the end of a day and can take an image of the business cards using his cellphone before putting away these cards. All the user needs to do is to hold a business card 322 in front of the cellphone 320 and activates the photo function of the phone camera. Depending on implementation, the user may preview the image before releasing the image to a designated server by a transmission means (e.g., email, short/long messaging or http/ftp via a network (e.g., GPRS, 3G or 4G network).

Figure 3D:
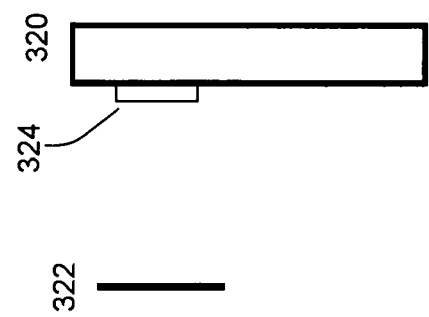
FIG. 3D shows that a micro-lens can be additionally added onto a phone camera of a cellphone when a business card is placed within an arm distance before the phone camera.

However, many phone cameras are designed to photo in a far distance and not meant to take images in near distance. Although some advanced phone cameras have an auto-focus mechanism, many current cellphones would not produce a clear image when a business card is present about 5-10 inches away from the phone camera. Accordingly, a modified lens (e.g., a micro-lens) may be used. FIG. 3D shows that a micro-lens 324 can be additionally added onto the phone camera of a cellphone 320 when the business card 322 is placed within an arm distance before the phone camera. To make it easy for the user to mound or dismount such a micro-lens 324 and to make one lens fit all, in one embodiment, the micro-lens or an end of it is laminated with a type of sticky material that can be repeatedly bonded to or taken off the surrounding surface of a phone camera.

Figure 3E:
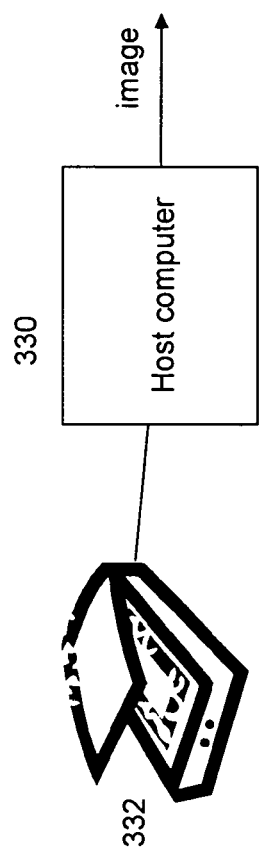
FIG. 3E shows a configuration of using a scanner (e.g., business card scanner, 1-D scanner or 2-D imager) operating with a host computer.

FIG. 3E shows a configuration of using a scanner 332 (e.g., business card scanner, 1-D scanner or 2-D imager) operating with a host computer 330. Different from the current configuration in which a scanner generates an image of a business card that is processed in a host computer for OCR, the configuration in FIG. 3E eliminates the OCR function in the host computer 330. As described above, the OCR function along with other necessary image processing functions are performed in the server. Accordingly, when the scanner 332 produces an image, the host computer 330 executes a software module that causes the image to be transported to the server by a data transmission means over a network (e.g., GPRS, 3G or 4G network). In one embodiment, the host computer 330 is configured to preprocess the image (e.g., to reformat the image to a predefined size/standard JPEG) before the image is transported to the server.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, the variable neutral density filter may be replaced by another device that can strengthen an optical signal. Accordingly, the scope of the present invention is defined by the appended claims rather than the foregoing description of embodiments.

I claim:

1. A mobile device comprising:
a camera provided to take a snapshot of a business card from a giver;
a display screen provided to allow a user of the mobile device to preview an image of the business card from the camera;
a memory space provided to buffer the image of the business card therein;
a network module provided to upload the image to a designated server over a data network when availability of the data network is detected, wherein the mobile device is caused to:

update a local address book with a text entry extracted from the image via an optical character recognition (OCR) engine;

display the image along with the text entry to show how this entry was obtained when requested; and synchronize a corresponding address book at a server with the text entry, wherein the corresponding address book at the server is maintained with the image.

2. The mobile device as recited in claim 1, wherein the server is configured to maintain an account for the user, the account includes a version of the address book with the entry together with the image, the mobile device is caused to update the address book therein by communicating with the server.

3. The mobile device as recited in claim 2, wherein the server is configured to automatically notify the giver of the business card about the entry of the business card into the account of the user.

4. The mobile device as recited in claim 2, wherein the server is configured to maintain an account for the giver, and automatically sends a request to the giver using contact information extracted from the image of the business card to enable a link between the account of the user and an account of the giver.

5. The mobile device as recited in claim 2, wherein the server is configured to automatically send an invitation to the giver using contact information extracted from the business card, inviting the giver to establish an account with the server.

6. The mobile device as recited in claim 2, wherein the memory space is configured to cache images of business cards as the camera is used to take images of the business cards, the images are collectively uploaded to the designated server at a predefined moment.

7. The mobile device as recited in claim 6, wherein the predefined moment is when the user activates a predefined key or the data network is detected.

8. A method comprising:

receiving in a server an image of a business card from a device associated with a user that has received the business card from a giver of the business card;

processing the image of the business card;

returning extracted data from said processing the image of the business card to the device, wherein the extracted data pertains to a record in a local address book in the device, wherein the record is displayed with the image when needed to show how the extracted data was obtained; and notifying the giver that the business card has been entered electronically by the user, wherein the giver is invited to establish an account to be linked to the account of the user when the giver has not had his/her own account with the server, or an account of the giver is set to be linked to the account of the user when the account of the giver is already established with the server so that the giver is able to manage the record to keep the user updated of any change to the record.

9. The method as recited in claim 8, wherein the device is a mobile device with a camera, and the mobile device is used by the user to take a snapshot of the business card using the camera; and configured to upload the image automatically to the server by way of data transmission over a data network.

10. The method as recited in claim 9, wherein the data transmission includes one of: email by which the image is emailed to the designated server, a dedicated phone number by which the image is sent thereto, and an HTTP or FTP link by which the image is transported to the designated server.

11. The method as recited in claim 8, wherein the device is an imaging device coupled to a host computing device, the imaging device is operated to produce the image from the business card and transported to the host executing a module that reformats the image to a predefined format and forwards the reformatted image to the designated server by a data transmission means.

12. The method as recited in claim 8, wherein the imaging device is a 1-D scanner or 2-D imager, and does not execute an OCR engine locally.

13. The method as recited in claim 8, wherein said processing the image of the business card with a human operator comprises:

executing an optical character recognition (OCR) engine to produce an initial version of the extracted data; and verifying the initial version of the extracted data by the human operator to produce the extracted data.

14. The method as recited in claim 13, wherein the initial version of the extracted data includes one or more errors, and said verifying the initial version of the extracted data by the human operator comprises correcting the one or more errors manually.

15. The method as recited in claim 13, wherein said processing the image of the business card with a human operator further comprises verifying the initial version of the extracted data with a database to ensure at least an email address in the initial version of the extracted data is substantially correct, and wherein said notifying the giver that the business card has been entered electronically by the user is performed based on the email address.

16. The method as recited in claim 15, wherein the database is gradually populated or updated over time in accordance with various contacts in registered accounts maintained in the server.

* * * * *